| United States Patent [19] | [11] Patent Number: 4,559,384 |
| Nomura et al. | [45] Date of Patent: Dec. 17, 1985 |

[54] PROCESS FOR PREVENTING AGGLOMERATION OF POWDERS BY USING TRIETHYLENEDIAMINE POLYMERS

[75] Inventors: Akihiko Nomura; Masahiko Fujii, both of Yamaguchi, Japan

[73] Assignee: Toyo Soda Manufacturing Co., Ltd., Yamaguchi, Japan

[21] Appl. No.: 683,484

[22] Filed: Dec. 19, 1984

[30] Foreign Application Priority Data

Dec. 20, 1983 [JP] Japan ............................. 58-238964
Feb. 17, 1984 [JP] Japan ............................. 59-27254

[51] Int. Cl.$^4$ ............................................. C08J 3/12
[52] U.S. Cl. .................................. 524/612; 252/383; 252/384

[58] Field of Search ............... 528/423; 252/381, 383, 252/384; 524/612

[56] References Cited

U.S. PATENT DOCUMENTS 3,112,320  11/1963  Farkas ............................. 252/383

Primary Examiner—Paul R. Michl
Attorney, Agent, or Firm—Oblon, Fisher, Spivak, McClelland & Maier

[57] ABSTRACT

A process for preventing the agglomeration of agglomerative powder, such as TEDA monomer piperazine, sodium chloride and ammonium chloride, comprising adding TEDA polymer to the agglomerative powder or adding TEDA to a solution from which the powdery material is crystallized.

9 Claims, 2 Drawing Figures

PROCESS FOR PREVENTING AGGLOMERATION OF POWDERS BY USING TRIETHYLENEDIAMINE POLYMERS

BACKGROUND OF THE INVENTION

1. Field of the Invention

The present invention relates to a process for preventing the agglomeration of powders through the use of triethylenediamine polymers as an agglomeration preventing agent for agglomerative powders.

Generally, powders often agglomerate on account of their coagulating and adhesive properties while they are kept in a silo or drum container. Hygroscopic or sublimative powders especially, are apt to agglomerate in the presence of a small amount of water or when the temperature is elevated. These agglomerative powders should be treated with care, otherwise difficulties in handling will result if the powders agglomerate. Countermeasures to prevent the agglomeration of said agglomerative powders to be used, include increasing the particle size of the powders, removing impurities in the powders, addition of an agglomeration preventing agent to the powders, storage of the powders in a tightly closed vessel, and covering the surface of the powder with an appropriate material (microcapsule). However, powders of amines such as piperazine triethylenediamine, anthraquinone and derivatives thereof and benzoic acid derivatives readily agglomerate with a slight elevation in temperature even when stored in a tightly closed vessel. On the other hand, strongly sublimative substances such as piperazine and triethylenediamine monomer more readily agglomerate when purified, which creates a serious problem for the prevention of agglomeration. These substances still retain their agglomerative property even when their particle size is increased. The agglomeration of the sublimative powders may be attributed to the fact that the particle substances are subjected to continuous sublimation and condensation, thereby increasing the contact area between the particles.

A conventional agglomeration preventing process which is effective for every particle including sublimative powders is to add an agglomeration preventing agent and also to form microcapsules.

Selection of the agglomeration preventing agent should be made with consideration of the following conditions. The addition can be minimized to achieve the purpose; the addition does not cause discoloration of the powders or does not give odor to the powders; physical properties of the powders are not affected or the effect, if any, can be minimized; and the agent does not cost much.

2. Description of the Prior Art

Conventionally agglomeration preventing agents used include powders of silica, inorganic salts such as $Na_2S_2O_5$ and liquids such as polyethyleneglycol. They are required to be applied in a relatively large amount, 0.02–1% by weight, in order to have a significant effect. The microcapsule process requires, in addition to the preparation of the powders, additional processes such as spray drying, vacuum evaporation and interfacial polymerization to make microcapsules. This process needs many kinds of machines and apparatus and operations thereof are troublesome.

Further, when an inorganic salt such as $Na_2S_2O_5$ or a liquid such as polyethyleneglycol is used, for instance, with triethylenediamine monomer, the physical properties of the monomer would probably be affected and therefore unable to be used for their particular purpose, such as catalyst for polyurethane.

SUMMARY OF THE INVENTION

The present inventors have made efforts to solve these problems and arrived at last at the completion of this invention.

The present invention provides a process for preventing the agglomeration of powders, comprising adding triethylenediamine polymer as an agglomeration preventing agent to agglomerative powders.

Further, this invention provides a process of preventing the agglomeration of powders, in which triethylenediamine polymer is added to a solution from which the powdery material is crystalized before the powder is crystalized.

DETAILED DESCRIPTION OF THE INVENTION

The agglomerative powders referred to in this invention apply to highly hygroscopic or sublimative powder such as peperazine, triethylenediamine, sodium chloride, ammonium chloride, etc. This invention exhibits a remarkable effect particularly on these powders. In addition, the triethylenediamine polymer added is not accompanied by any kind of discoloration or odor, has no effect on the physical properties and in addition, has a low cost in its use.

The triethylenediamine polymer to be used as an agglomeration preventing agent in this invention can be prepared in a number of processes, giving various particle sizes ranging from fine powders to granules. The particles of triethylenediamine polymer to be used in this invention should have an average particle diameter of not larger than $50\mu$, and preferably not larger than $10\mu$, in order for the optimum efficiency in preventing agglomeration of the agglomerative powder.

The method for preparing triethylenediamine polymer is not particularly restricted, but a process is preferred in which a triethylenediamine monomer is polymerized in the presence of a sulfuric acid catalyst at a temperature not lower than 170° C., preferably between 170° and 190° C. The polymerization reaction should be carried out below 200° C., otherwise the polymerization reaction will proceed further than is necessary. The one process employs heating over a long period of time, of triethylenediamine monomers at a temperature above 170° C. without any polymerization catalyst. However, the process employing a catalyst is more suited for a case in which a low molecular weight triethylenediamine polymer is desired, as in an industrial scale. The result is a granular product of a triethylenediamine polymer. The smaller the molecular weight of the triethylenediamine polymer is, the smaller the particle size is in general. For example, triethylenediamine polymer having a molecular weight ranging from 300 to 7000 with an average molecular weight of 2,500 was of an average particle diameter of not larger than $1\mu$, while another triethylenediamine polymer having a molecular weight ranging from 800 to 60,000 with an average molecular weight of 25,000 have an average particle diameter of $5-10\mu$. In this present invention, triethylenediamine polymer should have an average molecular weight from 220–60,000 and an average particle diameter of $0.1-50\mu$, preferably $0.1-10\mu$.

Triethylenediamine polymer produced by any other process, even in a granular form, may be crushed and divided into powder having a diameter of not larger than 50μ and can be used as an agglomeration preventing agent.

Any acid catalyst may be used without restriction for the polymerization catalyst of triethylenediamine monomer. They include inorganic acids such as hydrochloric, nitric and sulfuric acids, organic acids such as picric, benzenesulfonic, and trichloroacetic acids and alkyl halides such as methyl chloride. Among them, sulfuric acid is particularly preferred because low molecular weight triethylenediamine polymer is produced selectively.

The amount of triethylenediamine polymer in fine powders to be used for agglomerative powders differs slightly depending on the nature of the powder, but is not particularly restricted. Usually not more than 1.0 part by weight is applied to 100 parts by weight of powders. 0.001–0.1 part by weight, preferably 0.005–0.02 part by weight, suffices for attaining the object of this invention.

As a general trend, the effect of the agglomeration preventing agent increases with the amount of the agent. However, if the agglomerative powder is used in the form of a solution in a solvent, for example, when triethylenediamine is used as catalyst for polyurethane, an insoluble coagulant may be formed depending on the solvent applied. Therefore, the addition of a smaller amount is recommended to attain better results. More specifically in this invention, when agglomerative powder is used in the form of a solution in a solvent and an insoluble coagulant is formed, a negligible negative effect will appear with regard to the functions and physical properties of the powder.

There is no restriction of the way to add triethylenediamine polymer to the agglomerative powder. The powder is mixed with particular triethylenediamine polymer and the mixture may be mixed thoroughly with any V-type mixer or ribbon blender so far employed for mixing.

The crystalizing procedure referred to in the present invention is a procedure in which a solution containing the powder material as a solute is heated to evaporate the solvent, or a concentrated solution thus formed is cooled, or the evaporation and cooling occur simultaneously, to obtain the powder. There is no restriction on the solvent and the powder.

Triethylenediamine polymer used in this invention is insoluble in solvents and has a good resistance against heat. Particularly, non-crystalline triethylenediamine polymer of a low average molecular weight which assumes a colloidal form in a solution is added beforehand to the solution of the powder material.

The reasons for which agglomeration prevention is successfully achieved in this invention will be given as follows.

While the solution containing the powder material as a solute is concentrated by heating, triethylenediamine polymer is dispersed uniformly throughout the solution in the form of a colloid. Then, when the concentrated solution is cooled to deposit crystals, the dispersed molecules of the triethylenediamine polymer act as seed crystals and grow around the seeds as nuclei. As the crystals grow, they retain triethylenediamine polymer, and eventually said polymer tightly covers the crystal surface, which markedly suppresses sublimation and condensation of the crystal from and on the surface.

The triethylenediamine polymer to be used in the case of crystallization procedure has an average molecular weight of not more than 3,000, and preferably not more than 2,500. When the average molecular weight exceeds 3,000, the crystalline property of triethylenediamine polymer becomes worse when it is added to a solution dissolving the powder material. As a result, the powder deposited does not really uniformly contain the triethylenediamine polymer. Thus, the prevention of agglomeration is not achieved.

Further in this invention, even when the solution contains a large amount of impurities, the impurities do not affect the crystallization procedure at all and the full prevention of agglomeration can be obtained. Therefore this invention can be applied to any crystallization system.

There are many excellent characteristics found in the present invention which are more advantageous over conventional methods for preventing the agglomeration of powder, that is, methods such as, adding and mixing an agglomeration preventing agent to agglomerative powder or the microcapsule method, in that the present invention is simpler in its procedures, requires only a small amount of an agglomeration preventive agent to be added, and affects the physical properties of the powder very little.

Following are examples of this invention, but the present invention should not be limited to these examples.

The present invention will be more clearly understood from the following description of preferred embodiments with reference to the accompanying drawings.

The "parts" in examples are parts by weight.

DETAILED DESCRIPTION OF THE PREFERRED EMBODIMENTS

EXAMPLE 1

Figure 1:
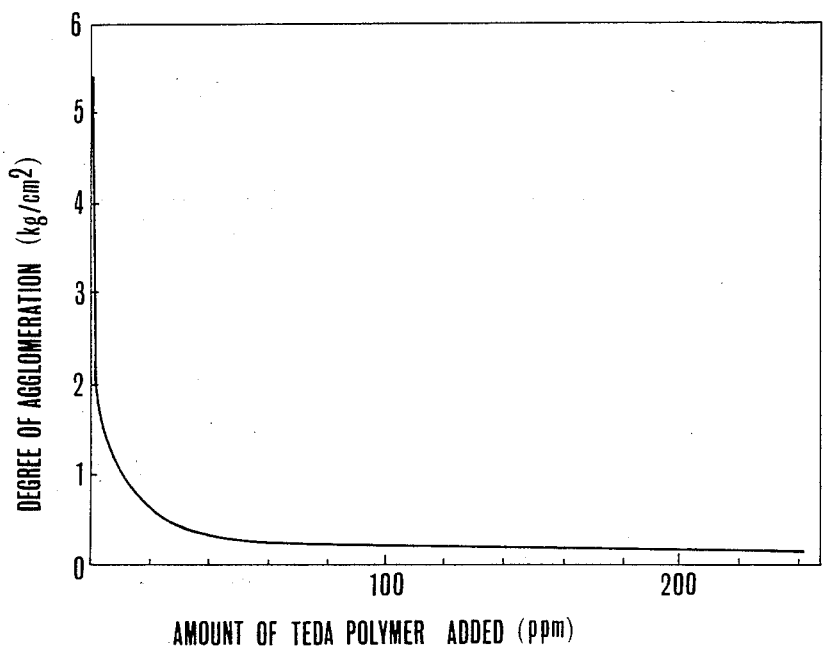
FIG. 1 shows the effect of the amount of fine powdery triethylenediamine (TEDA) polymer added on the degree of agglomeration.

In a 500 ml flask were placed; 350 g of triethylenediamine (hereinafter designates as "TEDA") monomer purified by sublimation, 100 cc of reagent grade methanol and 0.1 g of 97% concentrated sulfuric acid. The whole was heated with a mantle heater. Distilled methanol and small amount of water were condensed with a cooler and recovered. When the temperature of the solution reached 174° C., the distillation was completed upon closing of the distilling valve. Then reflux followed for 2 hours. The mixture was kept standing until the temperature fell below 60° C., then methanol was added to dissolve TEDA monomer which was not reacted. The TEDA polymer formed was deposited and separated from the supernatant liquor, washed 3 times with methanol and then dried under vacuum.

The TEDA polymer obtained, amounting to 1.7 g, and the molecular weight distributed from 400 to 7,000 with an average molecular weight of 2,500. The average particle diameter of the fine powder was not larger than 1μ.

REFERENCE EXAMPLE 1

The same procedure as in Example 1 was followed except that 0.2 g of silica powder having an average particle diameter of 5μ was added to 100 g of TEDA monomer. The degree of agglomeration was estimated to be 0.35 kg/cm$^2$ which was larger than that in Example 3.

REFERENCE EXAMPLE 2

The same procedure as in Example 3 was followed except that 3 g of polyethyleneglycol was added and mixed together. After 2 months, TEDA monomer in the drum was found to have agglomerated into a lump.

EXAMPLE 7

In a flask having a capacity of 2 liters was placed 1,000 g of a methanol solution of piperazine which was composed of 40 parts of piperazine and 60 parts of methanol. The TEDA polymer obtained in Example 1 having an average molecular weight of 2,500 was added in an amount of 0.03 g (corresponding to 0.0075 part per 100 parts of piperazine). The mixture was heated with a mantle heater. When 300 cc of methanol was distilled, the heating was stopped, the flask was soaked in a bath of water and cooled to 20° C. of the liquid temperature. Piperazine crystal thus separated was collected on a No. 5C filter paper by filtration under suction, washed with a small amount of reagent grade methanol and then dried under vacuum, to obtain 83 g of piperazine.

A fraction of the piperazine thus prepared was placed in a box and pressed with a weight in the same manner as in Example 1, and were all stored for a month in a desiccator. The breaking pressure was measured in the same manner as in Example 1, and the breaking occurred at a pressure of 0.05 kg/cm$^2$, which meant no occurrence of agglomeration.

EXAMPLE 8

Figure 2:
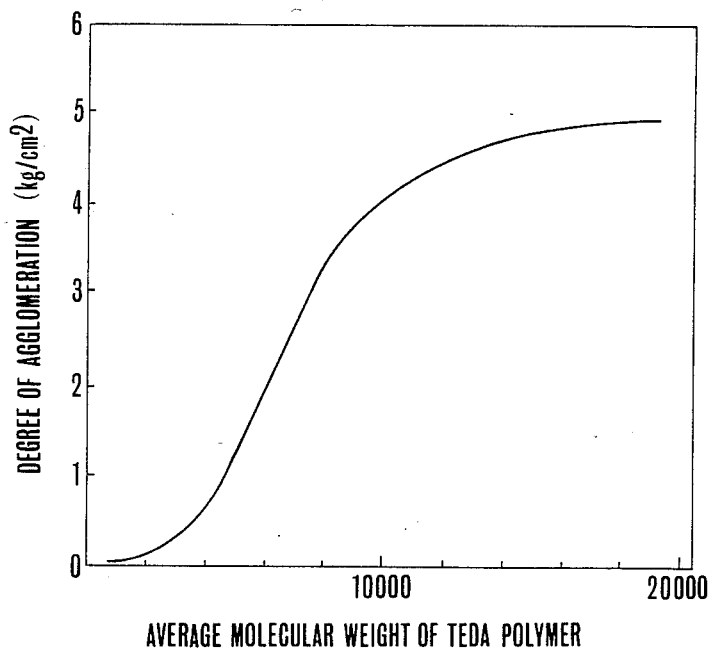
FIG. 2 shows the degree of agglomeration as a function of the average molecular weight of the TEDA polymer.

TEDA polymers having different values of average molecular weights which were prepared in Example 7 by varying the procedural conditions were used as they were in Example 7, to investigate the relation between the average molecular weight of TEDA polymer and the degree of agglomeration. The results are shown in FIG. 2. As is readily seen in the figure, a sudden increase in the degree of agglomeration occurs when the average molecular weight of TEDA polymer exceeds 3,000.

EXAMPLE 9

An aqueous solution of ammonium chloride in an amount of 1,000 g composed of 35 parts of ammonium chloride and 65 parts of water was placed in a flask having a 2 liter capacity, to which was added 0.02 g of TEDA polymer having an average molecular weight of 2,700 prepared in Example 1 by varying the procedural conditions (an amount corresponding to 0.006 part to 100 parts of ammonium chloride).

Heating was conducted with a mantle heater. When 300 cc of water was distilled, the heating was stopped, the flask was dipped in a bath of water, and cooled to 20° C. Crystal of ammonium chloride was separated on a No. 5C filter paper by filtration under suction, washed with a small amount of water and then dried under vacuum, to obtain 98 g of ammonium chloride crystal. The degree of agglomeration with respect to the crystal of ammonium chloride was estimated to be 0.05 kg/cm$^2$, the value showing no occurrence of agglomeration.

For the sake of comparison, crystal of ammonium chloride prepared by the same procedure except that any TEDA polymer was not added proved to have agglomerated with a degree of agglomeration of 2.3 kg/cm$^2$.

EXAMPLE 10

An aqueous solution of ammonium sulfate in an amount of 1,000 g composed of 40 parts of ammonium sulfate and 60 parts of water was placed in a flask having a 2 liter capacity, to which 0.02 g of TEDA polymer of an average molecular weight of 2,500 prepared in Example 1 (the amount corresponding to 0.005 part per 100 parts of ammonium sulfate) was added and the whole mixture was heated with a mantle heater.

The heating was stopped when 400 cc of water was distilled, then the same procedure as in Example 9 produced 241 g of ammonium sulfate. The ammonium sulfate did not agglomerate at all with a degree of agglomeration of 0.1 kg/cm$^2$. On the other hand, when TEDA polymer was not added, the product showed a degree of agglomeration of 4.1 kg/cm$^2$ and the agglomeration extended to the innermost portion.

EXAMPLE 11

An aqueous solution of sodium chloride in an amount of 1,500 g composed of 28 parts of sodium chloride and 72 parts of water was placed in a flask having a 2 liter capacity, to which 0.05 g of TEDA polymer prepared in Example 1 and having an average molecular weight 2,500 (the amount corresponding to 0.012 part per 100 parts of sodium chloride) was added and the whole mixture was heated with a mantle heater. The water was evaporated, while crystallizing sodium chloride. When 500 cc of water was distilled, the heating was stopped and 133 g of sodium chloride was obtained.

The degree of agglomeration estimated with the sodium chloride was 0.1 kg/cm$^2$, showing no agglomeration. On the other hand, when TEDA polymer was not used, the product of sodium chloride apparently agglomerated with a degree of agglomeration of 2.8 kg/cm$^2$.

EXAMPLE 12

An aqueous solution of sodium chloride in an amount of 1,800 g composed of 20 parts of sodium chloride, 70 parts of water and 10 parts of alkylpirazine and polyethyleneamine as insoluble matter was placed in a flask having a 2 liter capacity, to which 0.043 g of TEDA polymer obtained in Example 1 and having an average molecular weight 2,500 was added (the amount corresponding to 0.012 part per 100 parts of sodium chloride). The whole mixture was heated with a mantle heater. The heating was stopped when 600 g of water was distilled. The subsequent treatments were the same as in Example 11, and 107 g of sodium chloride was obtained. The sodium chloride did not agglomerate at all with a degree of agglomeration of 0.1 kg/cm$^2$. On the other hand, when TEDA polymer was not added, the product did agglomerate with a degree of agglomeration of 2.7 kg/cm$^2$.

What is claimed is:

1. A process for preventing agglomeration of a powders which comprises employing triethylenediamine polymer as an agglomeration preventing agent.

0.05 g of the TEDA polymer thus obtained was thoroughly mixed with 100 g of piperazine. The mixture was placed in a box 5 cm wide 2 cm high, and was covered with a plastic plate 5 cm wide on which a 300 g of weight was placed. The whole was kept in a desiccator. The pressure on piperazine amounted to 12 g/cm$^2$, which corresponded to the pressure to which piperazine would suffer when it is placed at the center part of a 25 kg fiber drum.

After one-month rest in the desiccator, the entire assembly was taken out and the weight and the box were removed. The product was placed on the plastic plate. A pressure was applied at the center of the piperazine block with a Kiya's hardness meter, to observe the pressure at which the block was broken into pieces. The breaking pressure amounted to only 0.05 kg/cm$^2$, and showed no agglomeration taking place. The estimated value was called 'Degree of Agglomeration' which quantitatively estimated the tendency for the formation of agglomerated powder. In the following examples and comparison examples, the degree of agglomeration was measured in the same manner.

COMPARISON EXAMPLE 1

The same procedure was followed as in Example 1, except that the TEDA polymer was not added. The degree of agglomeration was estimated to be 6.5 kg/cm$^2$ and the agglomeration extended to the inner portion.

EXAMPLE 2

The same procedure as in Example 1 was followed except that 0.1 g of nickel chloride was used as catalyst, and 1.1 g of TEDA polymer was obtained. The TEDA polymer had a molecular weight ranging from 400 to 42,000 with an average molecular weight of 17,000 and an average particle diameter of 5μ.

The same procedure as in Example 1 was followed except that 0.1 g of the TEDA polymer produced above was added to 100 g of sodium chloride. The degree of agglomeration observed was 0.05 kg/cm$^2$, showing that no agglomeration took place. On the other hand, a sodium chloride sample to which TEDA polymer was not added showed a degree of agglomeration of 3.5kg/cm$^2$, demonstrating the occurrence of agglomeration.

EXAMPLE 3

The same procedure as in Example 1 was followed except that 0.02 g of the TEDA polymer obtained in Example 1 was added to and mixed with 100 g of TEDA monomer.

The degree of agglomeration was estimated to be 0.1 kg/cm$^2$ which showed no occurrence of agglomeration. Further, the same experiments were made with varied amounts of the TEDA polymer. FIG. 1 shows the relation between the amount of TEDA polymer and the degree of agglomeration observed. As is readily seen in the figure, the degree of agglomeration becomes larger for the amount of TEDA polymer added, smaller than 0.002 part per 100 part of TEDA monomer. This tendency is predominant for the amount of TEDA polymer being not more than 0.001 part. On the other hand, when the amount exceeds 0.02 part only a negligible change in the degree of agglomeration can be seen.

EXAMPLE 4

The same procedure as in Example 1 was followed except that 0.05 g of benzenesulfonic acid was used as a catalyst, and 2.7 g of TEDA polymer was obtained. The molecular weight of the TEDA polymer distributed in the range from 800 to 60,000 with an average molecular weight of 25,000 and an average particle diameter of 5–10μ.

The TEDA polymer in an amount of 1 g was added to 25 kg of TEDA monomer and the whole mixture was thoroughly mixed in a V-type mixer for 2 hours. The resulting mixture was stored in a closed drum, and in 2 months the drum was opened and the content was examined to see the state of agglomeration. The monomer to which the TEDA polymer was not added showed agglomeration in the form of granules, while the monomer to which the TEDA polymer was added did not agglomerate. The latter was true even when the drum was stored for an entire year.

EXAMPLE 5

In a 30 cc autoclave were placed 11.2 g of TEDA monomer purified by sublimation and 0.016 g of benzenesulfonic acid (the amount corresponding to 0.001% in the molar ratio to the monomer), and the whole mixture was kept at 200° C. through the use of an electric heater to conduct polymerization for an hour. The reaction was completed and the TEDA polymer was obtained in a lump. (Molecular weights ranged from 1,100 to 75,000 and the average molecular weight was 29,000.)

The lump of TEDA polymer was crushed with a grinder, to obtain fine powder of TEDA polymer having an average particle diameter of 45μ.

The fine powder of TEDA polymer in an amount of 1.5 g was added to 25 kg of TEDA monomer and was then thoroughly mixed in a V-type mixer for 2 hours. The same treatment as in Example 4 followed, and the state of agglomeration was examined after 2 months to find no agglomeration.

COMPARISON EXAMPLE 2

The lump of TEDA polymer produced in Example 5 was shaved with a knife and crushed in a mortar to obtain fine powder of TEDA polymer having an average particle diameter of 70–100μ. 3 g of TEDA polymer in fine powder was added to 25 kg of TEDA monomer and the same procedure as in Example 4 was carried out. After 2 months, the state of agglomeration was examined and complete agglomeration was found to have occurred up to the central part of the drum.

EXAMPLE 6

The same procedure as in Example 1 was followed except that 100 g of agglomerated piperazine was thoroughly crushed and added thereto was 0.05 g of the TEDA polymer obtained in Example 1. These were then mixed together. The degree of agglomeration observed to be 0.15 kg/cm$^2$, which proved that agglomeration did not occur in a practical sense. For the sake of comparison, the same procedure as above was followed without adding TEDA polymer. The degree of agglomeration estimated after one-month standing was 4.5 kg/cm$^2$, demonstrating substantial agglomeration.

2. The process of claim 1 wherein triethylenediamine polymer is added in an amount ranging from 0.001 to 1.0 part by weight to 100 parts by weight of the powder.

3. The process of claim 2 wherein the triethylenediamine polymer is added in an amount ranging from 0.001 to 0.1 part by weight.

4. The process of claim 2 wherein the triethylenediamine polymer is added in an amount ranging from 0.005 to 0.02 part by weight.

5. The process of claim 1 wherein triethylenediamine polymer has an average particle diameter ranging from $0.1\mu$ to $50\mu$.

6. The process of claim 1 wherein triethylenediamine polymer has an average particle diameter ranging from $0.1\mu$ to $10\mu$.

7. The process of claim 1 wherein the average molecular weight of triethylenediamine polymer is in the range of from 220 to 60,000.

8. The process of claim 1 wherein the average molecular weight of triethylenediamine polymer is in the range of from 220 to 3,000 and added to a solution form from which the powder is crystallized in a crystallizing procedure.

9. The process of claim 1 wherein the powder is triethylenediamine monomer, piperazine, sodium chloride or ammonium chloride.

* * * * *